T. W. B. WATLING.
COIN CONTROLLED WEIGHING SCALE.
APPLICATION FILED MAY 25, 1914.
1,289,060.
Patented Dec. 24, 1918.
3 SHEETS—SHEET 1.
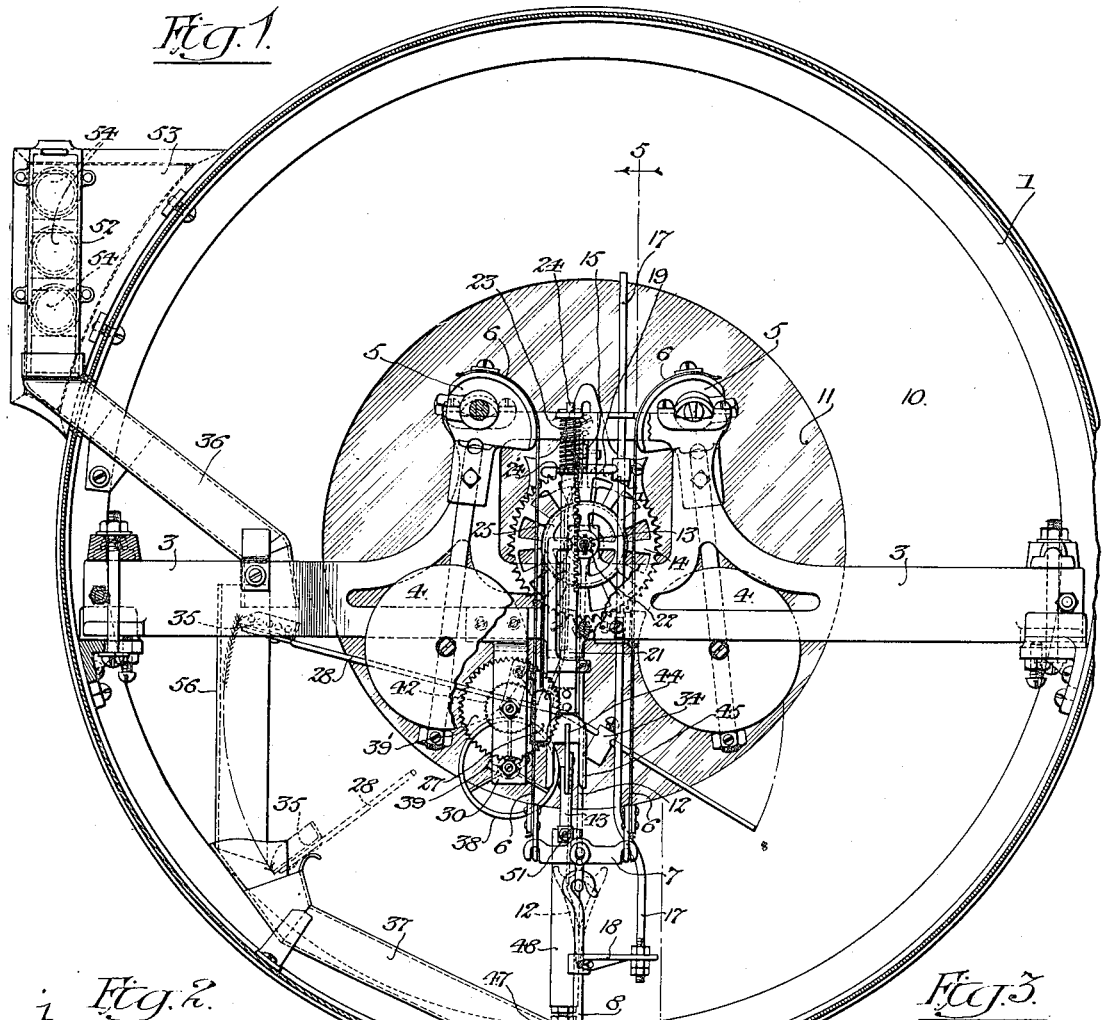
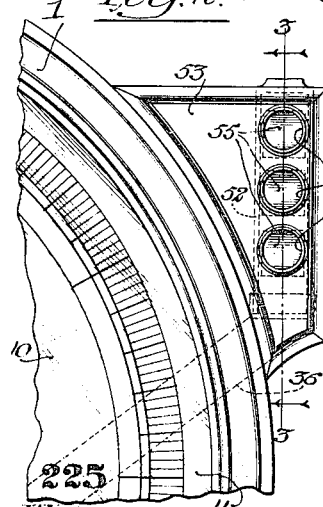
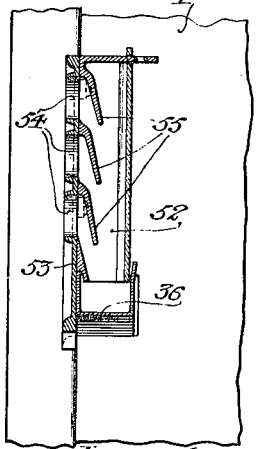
Witnesses:
Inventor:-
Thomas W. B. Watling

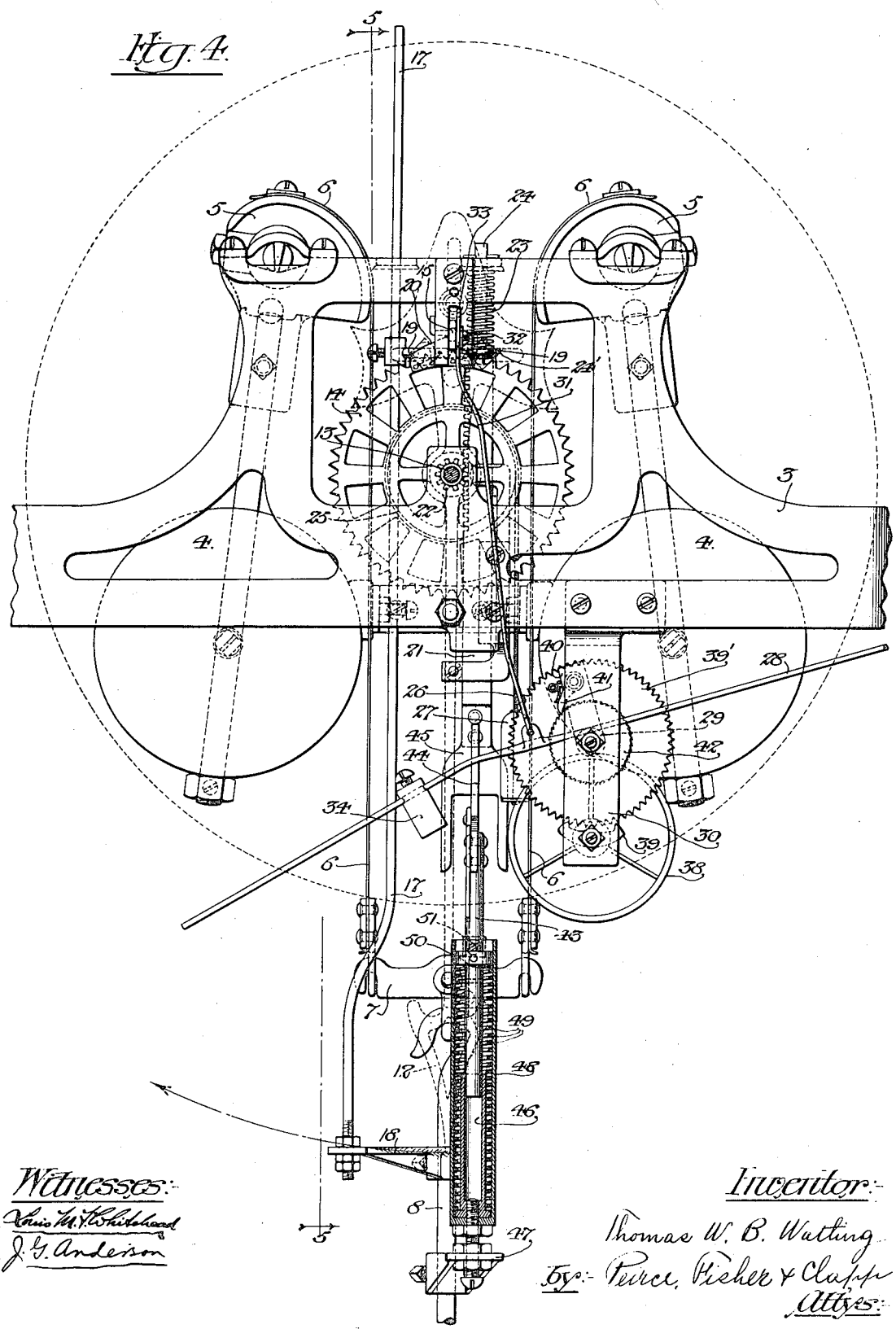

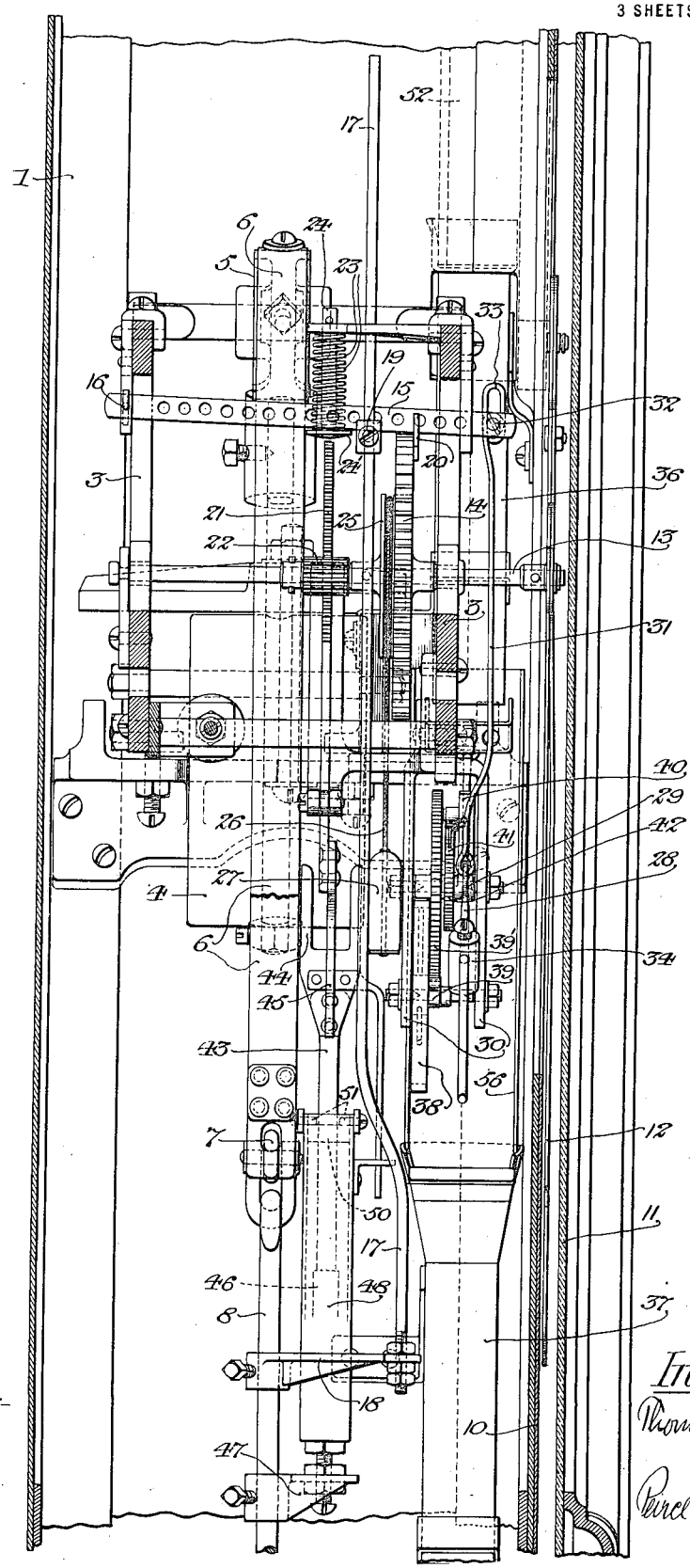

UNITED STATES PATENT OFFICE.

THOMAS W. B. WATLING, OF CHICAGO, ILLINOIS.

COIN-CONTROLLED WEIGHING-SCALE.

1,289,060.   Specification of Letters Patent.   Patented Dec. 24, 1918.

Application filed May 25, 1914. Serial No. 840,742.

*To all whom it may concern:*

Be it known that I, THOMAS W. B. WATLING, a citizen of the United States, and a resident of Chicago, in the county of Cook and State of Illinois, have invented certain new and useful Improvements in Coin-Controlled Weighing-Scales, of which the following is a full, clear, and exact description.

The invention relates to coin-controlled weighing scales and seeks to provide suitable coin-controlled mechanism which is actuated by each of the coins deposited, in connection with means for returning a definite proportion of the coins deposited to the users of the machine.

The invention consists in the features of improvement hereinafter set forth, illustrated in the preferred form in the accompanying drawings and more particularly pointed out in the appended claims.

In the drawings, Figure 1 is a vertical section of the upper portion of the improved weighing scale, the mechanism thereof being shown in rear elevation. Fig. 2 is a detail view in front elevation. Fig. 3 is a section on the line 3—3 of Fig. 2. Fig. 4 is an enlarged front elevation of the operating mechanism with parts shown in section. Fig. 5 is a sectional view on the lines 5—5 of Figs. 1 and 4.

The machine casing comprises a circular head 1 mounted upon the upper end of a column 2. A horizontal supporting frame 3 is arranged within the head 1. The weighing mechanism preferably comprises two weighted pendulums 4 which are pivotally mounted at their upper ends upon the central upwardly projecting portion of the frame 3. A pair of cams 5 are fixed to the pivots of the weighted pendulums 4 and shift therewith. Two flexible, metal bands or straps 6 are fixed to and extend over the faces of the cams 5 and thence downwardly therefrom to a common cross bar 7 which is connected to the lower ends of the straps. A connecting rod or link 8, which is preferably provided with an adjusting turnbuckle 9, is connected at its upper end to the cross bar 7 and at its lower end to the usual weighing levers and the platform (not shown) which are arranged at the lower end of the column 2. The weight of a person or object on the platform will, in the usual manner, shift the connecting link or rod 8 of the mechanism and thereby, through the medium of the straps 6, swing the pendulums 4 outwardly. The cams 5 are so shaped that the extent of movement of these parts is directly proportional to the weight placed upon the platform of the scales. Other suitable weighing mechanism may be provided, if desired.

At the front of the head 1 is arranged a dial 10 which is covered by a glass plate 11 and over which moves an indicating hand or pointer 12. The indicator 12 is fixed to the front end of a horizontal shaft 13 which is journaled in the framework. While the extent of movement of the indicator is controlled by the weighing mechanism, the indicator is movable independently of the weighing mechanism and suitable locking means is provided for holding it in different positions. This locking means comprises a toothed wheel 14 which is fixed to the shaft 13 and a catch lever 15 which is arranged to engage the teeth of the locking wheel. This catch or lever, as most plainly shown in Fig. 5, is connected at its rear end by a pivot pin 16 to the upper portion of the supporting frame 3 and extends forwardly from its pivot over the locking wheel. The catch 15 is adapted to be disengaged from the locking wheel both by a coin-controlled mechanism and also by a shifter connected to the weighing mechanism. The latter comprises a vertical shifter rod 17 which is fixed at its lower end to an arm 18 that projects laterally from the upper end of the connecting rod or link 8 of the weighing mechanism. The upper end of the shifter rod 17 is provided with a laterally projecting arm 19 which extends beneath the catch lever 15. In the normal, idle position of the parts, the arm 19 holds the catch 15 out of engagement with the teeth of the locking wheel 14. The latter, however, is provided with a large tooth or projecting lug 20 which, in zero position of the indicator, normally engages the catch 15 and holds the indicator against movement from zero position.

The indicator 12 is adapted to be shifted from zero position by a vertically movable actuator or toothed rack 21 which is arranged to engage a pinion 22 fixed on the shaft 13. This rack is guided in suitable bearings in the supporting frame 3 and is shifted by gravity to turn the indicator from zero position in the direction indicated by the arrow in Fig. 4. The actuator rack also serves, in the normal position of the parts, to hold the stop lug 20 against the catch 15. A stop plunger 24 having a head 24' is yieldingly held in position by a spring 23 and serves to limit the upward movement of the actuator rack 21. The shaft 13 of the indicator is also provided with a pulley 25 and a cord 26 passing over this pulley is provided with a weight 27 which also tends to turn the indicator from zero position and serves to take up any lost motion between the rack 21 and the pinion 22.

When a weight is placed upon the platform of the scales, the link or rod of the weighing mechanism and the shifter rod connected thereto are depressed and this movement is continued independently of the indicating devices until the weighted pendulums have swung out far enough to counterbalance the weight on the platform. The weight, however, will not be indicated until the coin is deposited in the machine. The catch is lifted out of engagement with the lug 20 of the locking wheel to permit the movement of the indicator over the dial by means of a coin-controlled trip or arm 28 which is fixed at a point intermediate its ends to a hub 29 which is pivotally mounted in a bracket 30 that depends from the supporting frame 3. A link 31 is connected to the trip arm 28 adjacent its pivot point and the upper end of the link is connected to the forward end of the catch 15. Connection between the link and the catch is effected by means of a pin 32 fixed to the catch and extending through a vertical loop 33 formed in the upper end of the link, so that a lost motion connection is provided between the catch and the coin-controlled trip 28.

One end of the trip 28 is provided with a counterbalance 34 which normally holds its opposite end elevated. The opposite elevated end is provided with a coin-receiving pan or receptacle 35 which is normally located beneath the discharge end of the coin-chute 36 to receive the deposited coins. When a coin is deposited, it drops into the pan 35 and shifts the trip, as indicated in dotted lines in Fig. 1. This shift of the trip lifts the catch 15 through the medium of the link 31 so that the indicator pointer 12 is free to be shifted over the dial 10 to indicate the weight on the platform.

When the trip is shifted to the dotted position shown in Fig. 1, the coin drops out of the pan or receptacle 35 into a second coin-chute 37 and the trip is returned to normal position so that the catch 15 is engaged with the locking wheel 14 to hold the indicator hand against movement. This return movement of the trip 28 and catch 15 is retarded so that ample opportunity is afforded for the proper positioning of the indicating hand. The retarding means comprises a balance wheel 38 mounted on the bracket 30 and provided with an escapement pallet 39 which coöperates with the teeth of an escapement wheel 39'. An arm 40 fixed to the hub 29 is provided with a spring-held pawl 41 which coöperates with the teeth of a ratchet wheel 42 that is fixed to the escapement wheel 39'. During the forward movement of the coin-controlled trip 28, the dog 41 passes idly over the teeth of the ratchet 42 but the return movement of the trip, effected by the counterweight 34, rotates the ratchet wheel 42 and the wheel 39', and this return movement is retarded in a well known manner by means of the oscillating balance wheel 38 and escapement pallet 39.

The extent of movement of the indicator is determined by a stop device which shifts with the weighing mechanism. This stop device, in the preferred form shown, comprises a plunger 43 provided with a forked member 44 at its upper end which coöperates with a forked member 45 in the lower end of the rack bar 21. The lower end of the plunger 43 is arranged within a tube 46 which is fixed to an arm 47 that projects laterally from the connecting link or rod 8 of the weighing mechanism. A second tube 48 surrounds the tube 46 and a coil spring 49 within the latter engages a collar 50 on the plunger 43 and holds the collar in engagement with a pair of lugs 51 which extend through the walls of the tube 48 at its upper end.

When the weight of a person or object is placed on the platform of the scales, the connecting rod or link 8 of the weighing mechanism is depressed, until the weight is counterbalanced by the outward swing of the pendulums 4. This shift of the connecting rod or link 8 moves the shifter rod 17, as described, so that the arm 19 thereon is disengaged from the catch 15 which coöperates with the locking wheel 14. At the same time, the stop plunger 43 is depressed. When a coin is placed in the machine, the trip 28 is shifted to temporarily release the catch 15 and permit the movement of the indicator under the influence of the rack 21 and weight 27. This movement of the indicator is limited by the engagement of the forked member 45 on the lower end of the rack 21 with the forked member 44 upon the upper end of the stop member 43. The spring 49 holds the stop plunger in position to positively limit the shift of the indicating hand or pointer. Inasmuch as the position of the stop plunger is determined by the weighing mechanism, the pointer will probably indicate the weight on the platform. At the end of the retarded, return movement of the trip 28, the catch 15 engages the teeth of the locking wheel 14 and holds the indicating hand or pointer in its shifted position.

When the weight is removed from the platform of the scales, the parts of the weighing mechanism are, of course, returned to normal position by the weighted pendulums 4. During this shifting of the weighing mechanism back to zero position, the indicator will still be locked in its shifted position so that another person or object cannot be weighed. Inasmuch as the parts of the indicator are thus locked against movement, the stop plunger 43 cannot move back to normal position with the weighing mechanism and the spring 49 will be compressed. When the weighing mechanism approaches or reaches zero position, the arm 19 of the shifter rod 17 will lift the catch 15 and the spring 49 will return the stop plunger 43 and the parts of the indicator mechanism to normal, zero position.

The coin-chute 36 extends upwardly and outwardly from an opening in the cylindrical head or casing 1 and at its upper end is provided with an upwardly projecting vertical portion 52. The front plate 53 of which vertical portion is provided with a plurality of slots 54, three in number in the form shown. These slots or openings are circular in outline and preferably, as shown, inclined deflecting plates 55 are arranged within the chute section 52 and over the openings or coin-slots 54. Between the discharge end of the chute 36 and the inlet end of the second coin-chute 37 is arranged a suitable guard 56 for properly guiding the coin into the second chute 37 when it drops from the pan or coin receptacle 35. The second coin-chute is provided with two discharge portions 57 and 58. The discharge portion 57 opens within the hollow column 2 into a suitable coin receptacle therein, while the lower curved end of the discharge portion 58 leads to an opening 59 in the wall of the column or casing section 2, to thereby deliver coins to the exterior of the machine casing or into a suitable cut on the exterior of the machine casing. A coin-actuated switch device is arranged to deflect the coins passing through the chute 37 into one or the other of the discharge portions 57 and 58. In the form shown, the switch is mounted upon a pivot 60 and comprises a comparatively long upper wing 61 and two relatively short lower wings 62. Normally, one of the lower short wings 62 engages one of the side walls of the chute, while the upper relatively long wing engages the opposite side wall, the remaining short wing being in central position, as shown in Fig. 1. A coin passing through the chute would be deflected by the upper wing onto the short wing in engagement with the opposite side wall. The weight of the coin will turn the switch device and permit the passage of the coin into one or the other of the discharge portions 57 and 58. If, for example, we assume that the switch device is in the position shown in full lines in Fig. 1, the first coin deposited will be deflected by the switch into the discharge portion 58 and will thereby be returned to the exterior of the machine casing. The weight of the coin, however, in passing the switch device will turn it into the position shown in dotted lines in Fig. 1, so that the next coin deposited will pass into the discharge portion 57 and will be retained within the machine. In this way, each alternate coin deposited in the machine will be returned to the user, although each coin deposited will release the weighing mechanism. Inasmuch as a plurality of coin openings or slots are provided in which a coin may be inserted, considerable amusement will be afforded to the user of the machine in endeavoring to select the proper slot to obtain a free weight.

Obviously, numerous changes may be made in the details set forth without departure from the essentials of the invention as defined in the claims.

I claim as my invention:—

1. In a coin-controlled machine, the combination with a coin-controlled mechanism, of means having a plurality of coin-receiving slots for delivering the deposited coins to said mechanism, and means for returning an unvarying predetermined portion of the deposited coins to the users of the machine.

2. In a machine of the class described, the combination with the machine casing, of coin-controlled mechanism in said casing, means having a plurality of coin-receiving slots for delivering the deposited coins to said coin-controlled mechanism, and means for returning an unvarying predetermined portion of the coins passing from said mechanism to the exterior of the machine casing.

3. In a coin-controlled machine, the combination with the machine casing, of coin-controlled mechanism in said casing, means having a plurality of coin receiving slots for delivering the deposited coins to said mechanism, and means including a coin operated switch for delivering an unvarying predetermined portion of the deposited coins to the exterior of the machine casing.

4. In a machine of the class described, the combination with the machine casing, of coin-controlled mechanism in said casing, a coin-chute for delivering the deposited coins to said mechanism, a second coin-chute for receiving the coins from said mechanism having a discharge portion opening exteriorly of said casing, and a switch controlled by the coins passing from said mechanism for deflecting an unvarying predetermined portion of the coins through said discharge portion.

5. In a machine of the class described, the combination with the machine casing, of coin-controlled mechanism in said casing, a coin-chute having a plurality of inlet slots for delivering the deposited coins to said mechanism, a second chute for receiving the coins from said mechanism having separate discharge portions, one opening exteriorly of the machine casing, and a switch interposed in said second chute and actuated solely by the coins passing therethrough for deflecting the coins into one or the other of said discharge portions.

6. The combination with the machine casing, of the coin-controlled mechanism therein, means for delivering all of the deposited coins to said mechanism, and a switch device actuated by the coins passing from said mechanism for delivering an unvarying predetermined portion of the deposited coins to the exterior of the machine casing.

7. In a coin controlled machine, the combination of a casing, of a coin controlled mechanism in said casing, said casing having coin receiving and discharge openings, means for delivering each of the deposited coins into operative relation with said coin controlled mechanism and means, including a coin actuated deflecting switch, for delivering a portion of the deposited coins to the exterior of the casing.

8. In a coin controlled machine, the combination with a casing, of a coin controlled mechanism therein, means having a plurality of coin receiving slots arranged to deliver the coins deposited in each of said slots into operative relation with said coin controlled mechanism, and means, including a deflecting switch, for delivering an unvarying predetermined portion of the deposited coins to the exterior of the machine casing.

9. In a coin controlled machine, the combination of a casing having a series of coin receiving slots, a coin controlled mechanism in said casing, a single chute for delivering the coins deposited into each of said slots into operative relation with said coin controlled mechanism, a second coin chute for receiving the coins from said mechanism having a discharge portion opening exteriorly of said casing and a switch in said second chute arranged to deflect a certain portion of the coins into said exteriorly opening discharge portion.

10. In a coin-controlled machine, the combination with a casing, of a coin-controlled mechanism therein, means including a coin-actuated deflecting switch for delivering an unvarying predetermined portion of the deposited coins to the exterior of the casing, and means for delivering all of the deposited coins successively into operative relation with said coin-controlled mechanism and said switch to effect the successive operation thereof.

11. In a coin-controlled machine, the combination with a casing, of a coin-controlled mechanism therein, a coin-actuated switch in said casing for deflecting a portion of the deposited coins to the exterior of the casing and means having a plurality of coin-receiving slots arranged to deliver the coins deposited in each of said slots successively into operative relation with said coin-controlled mechanism and said switch to thereby effect the successive operation thereof.

THOMAS W. B. WATLING.

Witnesses:
GEO. F. FISHER,
J. G. ANDERSON.